Aug. 21, 1956 G. GUANELLA ET AL 2,760,188

PROXIMITY CONTROL DEVICE

Filed March 1, 1951

INVENTORS:
GUSTAV GUANELLA
PAUL GÜTTINGER
BY
ATTORNEY

United States Patent Office 2,760,188

Patented Aug. 21, 1956

2,760,188

PROXIMITY CONTROL DEVICE

Gustav Guanella, Zurich, and Paul Güttinger, Wettingen, Switzerland, assignors, by mesne assignments, to Radio Patents Company, a partnership Application March 1, 1951, Serial No. 213,329

Claims priority, application Switzerland March 3, 1950

3 Claims. (Cl. 343—7)

This invention is related to proximity control devices, such as proximity fuzes which operate according to the heterodyne principle.

In a known type of such devices a radio frequency wave of constant frequency is emitted which is reflected by an object moving relatively to the device (e. g. an aircraft or the earth's surface). The reflected wave, when reaching the device, beats with the emitted wave. In a detector, a low or beat frequency voltage is produced which, after sufficient amplification, releases the desired effect, e. g. the firing of a detonator.

A disadvantage of this type of proximity control device is the fact that the amplitude of the emitted radio frequency wave is limited by the non-linear characteristic of the oscillator and that therefore the low frequency amplitude is limited accordingly, whereby the sensitivity of the device is considerably reduced. By the present invention, this disadvantage is substantially overcome.

Furthermore, the response of proximity fuzes to vibration makes it impossible to provide a high operating sensitivity. These inevitable vibrations, occurring when the device is in flight, cause unwanted noise voltages to appear in the output of the amplifier tubes which may lead to misfiring of the detonator. There are two different types of noise to be distinguished hereinafter referred to as low-frequency microphonics and high-frequency microphonics, respectively. By low-frequency microphonics is understood that the plate current of the oscillator tube is affected by the mechanical deformation of the electrodes due to vibrations. These vibrations thus directly cause a low-frequency noise voltage. By high-frequency microphonics is understood that the amplitude of the generated wave is influenced by the vibrations, i. e. the emitted wave is amplitude-modulated. This kind of microphonics originates chiefly from alterations of the transconductance of the oscillator tube due to mechanical vibration of its electrodes. Investigations have shown the low-frequency microphonics to be the major cause of trouble. This invention, therefore has for its further object the elimination of this type of disturbance. In the known types of proximity fuzes, the oscillator tube serves for the double purpose of oscillation and detection. The low-frequency oscillations produced by the beating of the received (reflected) wave against the emitted wave are set up at the plate of the tube, as are the radio-frequency oscillations. Furthermore, the noise voltages caused by low-frequency microphonics appear at the plate of the tube. These voltages cannot be separated from the useful low-frequency oscillations in the known devices.

This invention is characterised by the provision of means for controlling the amplitude of the generated wave by limiting the same to such a value, that the dynamic transconductance of the oscillator tube is substantially independent of amplitude variations within an extended operating range. The oscillator tube which produces the emitted wave and simultaneously receives the wave reflected by a nearby object, is succeeded by a rectifier coupled thereto through a high-pass filter, to produce a beat or low-frequency oscillation which, in turn, is fed to the input of the low-frequency amplifier. Limiting of the amplitude of the emitted wave permits amplification of the low-frequency oscillation at maximum transconductance, provided the beating (reflected) wave has not too great an amplitude. In fact, this amplitude in practive will not exceed 10% of the emitted wave amplitude but will, in most cases, be very much smaller than this figure. As a result, the beat oscillation formed by the combination of both the emitted and the reflected waves, has a maximum possible amplitude or the device operates at the highest possible sensitivity.

The invention will become more apparent from the following detailed description considered in conjunction with the accompanying drawing, forming part of the specification, and wherein.

Like reference numerals identify like parts in the several views of the drawing.

Figure 1:
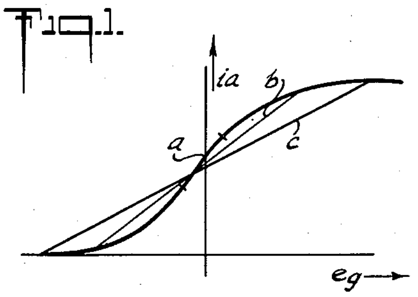
Figures 1 and 2 are theoretical curves explanatory of the function of the invention.
Figure 2:
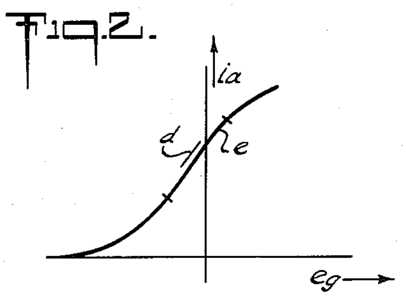

Referring to Figures 1 and 2 which show the grid voltage-plate current characteristic of an oscillator tube, it is a well-known fact, that, by increasing the amount of feedback, sustained oscillations may be generated, provided the transconductance exceeds a certain minimum value, depending upon the parameters of the other circuit elements. At the very start, the oscillation amplitude is usually small, its increase being prohibited by the decrease of the transconductance due to the non-linearity of the characteristic. In Figure 1, section *a* shows the part of the characteristic for small amplitudes. An increase of the oscillation amplitude result in a decrease of the average transconductance, as shown by lines *b* or *c*, each connecting the extreme points of the characteristic encompassed by the oscillations. As a result the efficiency of the tube as a detector and an amplifier is reduced and could only be improved by decreasing the degree of feedback. In proximity fuzes, however, a high degree of feedback is required, to prevent supply voltage changes or changes in tube characteristics and the like from interrupting the oscillations. As an example, the oscillations may encompass that part of the characteristic which is represented by line *b*, while an external signal may cause the oscillations temporarily to follow line *c*. It is easily seen, therefore, that, due to the curvature of the characteristic, any increase in oscillation amplitude causes decrease of the transconductance (slope of line *c* as against line *b*). This results in decreased efficiency of detection and amplification, which could only be overcome by reducing the degree of the feedback.

According to this invention, the oscillation amplitude is reduced by an automatic control so that no considerable decrease of transconductance occurs, even if the amplitude is increased by relatively large proportions, e. g. from section *d* to section *e* in Figure 2. These two sections possess almost the same transconductance at very different amplitudes. As a result any disturbance upon the circuit will considerably affect the amplitude until a new stable condition will have been reached. This is only true, however, if the amplitude controlling means are not yet operative or come into action with a sufficiently great time delay. In other words, according to the invention, the tube is allowed to operate within an extended amplitude range as an oscillator, while at the same time being able to maintain a high degree of sensitivity and in turn optimum amplification of the signals simultaneously received from a reflecting object.

Figure 3:
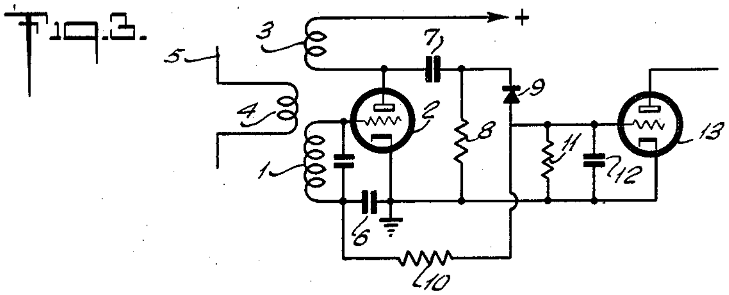
Figure 3 is a circuit diagram of a transmitter-amplifier for a proximity control device constructed in accordance with the invention.

Referring to Figure 3, the oscillator comprises in a known manner a tuned grid circuit 1, the three-electrode tube 2 and the feedback coil 3. The oscillations produced in the circuit 1 are transferred to the antenna 5 by means of coil 4. The tuned circuit 1 is connected to the cathode of tube 2 through condenser 6. Steady bias is applied to the grid of the tube through a resistor 10. The oscillations are further transferred from the plate of tube 2 to resistor 8 and rectifier 9. The D. C. voltage supplied by this rectifier serves to excite the grid of the amplifier tube 13. The output circuit of the amplifier may include the hot wire of a detonator. Resistor 11 provides a D. C. return for the rectifier 9, while the condenser 12 connected in parallel to resistor 11 serves to short-circuit the radio frequency components. As a result, only the low-frequency components are effective at the input of the amplifier when the fuze approaches a reflecting object or target. The D. C. voltage set up across resistor 11 is furthermore used as bias voltage for the oscillator tube 2. The value of this bias is selected so that the amplitude of the oscillations is limited to an extent which permits the transconductance to remain substantially constant and independent of the oscillation amplitude. Excitation of the oscillator is thus automatically limited to an extent where no decreasing effect of the non-linear characteristic upon the transconductance is noticeable.

This arrangement operates in the following manner: When the proximity fuze is at a far distance from any reflecting object, the oscillation amplitude is constant as is the D. C. voltage across resistor 11. This voltage is used as a negative bias at the grid of tubes 13 and 2. The average bias at tube 2 is so chosen that the tube operates on a linear portion of the grid voltage-plate current characteristic, or a portion which extends slightly into the lower band or region of non-linearity. Accordingly, a small change of the amplitude causes a corresponding variation of the A. C. plate current. The excitation of the tube is, however, limited and never reaches the upper bent or region of non-linearity. The bias is applied to the grid of the tube through the resistor 10 and depends upon the A. C. plate voltage of the tube 2. An increase of the excitation increasing in turn the A. C. plate voltage, thus increases the D. C. voltage across resistor 11 or the bias at tube 2. As a result, the operating point is shifted to a smaller average transconductance and a new state of equilibrium is established. The opposite effect takes place when the excitation is decreased by any cause. Thus the D. C. voltage across resistor 11 has a stabilizing effect upon the excitation and keeps it from reaching the upper region of non-linearity (*b*, *c*, Figure 1). The oscillation amplitude is therefore limited and the transconductance is maintained nearly constant in spite of the amplitude fluctuations occurring under normal operating conditions.

If now reflected waves are received, these act upon the plate current of tube 2 in accordance with the existing transconductance, and the arrangement operates at the maximum possible sensitivity. The low-frequency components produced by rectifier 9 and exciting the grid of amplifier tube 13 thus have a maximum possible amplitude and as a result the subsequent low-frequency amplification may be kept relatively small. Accordingly, the signal-to-noise ratio of the device is considerably improved, and with it the dependability of the fuze.

In Figure 3, the condenser 6 and resistance 10 provides a low path filter for the grid bias potential, to prevent the signals varying at the Doppler beat frequency from affecting the automatic control or to limit the stabilization to oscillation amplitude fluctuations at a rate below the range of beat frequencies encompassed by the transmitted and reflected oscillations.

Figure 4:
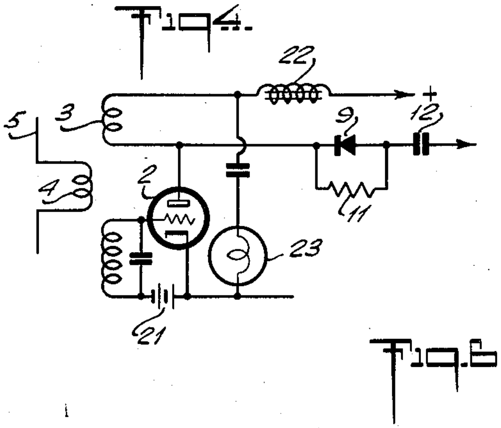
Figures 4 and 5 are alternative circuit diagrams illustrating modifications of the invention.
Figure 5:
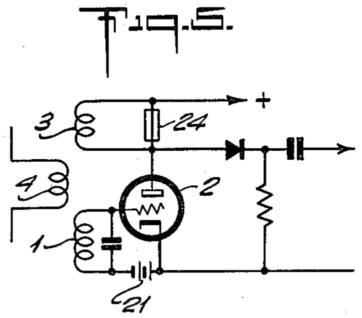

Figures 4 and 5 show two different methods for limiting the amplitude of the generated oscillations. According to Figure 4, the grid of tube 2 is connected to a source of fixed bias 21. A radio frequency choke 22 is connected in series with the feedback coil 3. The high-frequency end of this choke is connected to a current-dependent resistor 23 through a blocking capacitor. The D. C. plate current is applied through a choke 22 and the high-frequency plate current passes through resistor 23. An increase of the high-frequency amplitude causes the resistance of the current-dependent resistor 23 to rise and to thus apply a greater load on the oscillating circuit. This acts against an increase in amplitude and thus, again, the amplitude is limited to a certain extent without decreasing the average transconductance. The control action by resistor 23 occurs with a certain time delay, owing to its thermal inertia being the equivalent of the low-pass filter 6, 10 of Figure 2. Fast amplitude variations are not suppressed therefore, whereby the beat oscillations produced by the received waves are passed unaffectedly. Figure 5 shows a current-dependent resistor 24 with a negative temperature coefficient connected in parallel to the feedback coil. An increase of the high-frequency amplitude causes this resistor to reduce its resistance and thus to reduce the voltage across the feedback coil. This again limits the high-frequency amplitude to the desired value, the regulating action operating with a time delay for the same reasons as explained before. This time delay must be so small, that soon after closing the circuit the regulating action is started. It must, however, be great enough so as not to reduce the low-frequency amplitude produced by the beating of the reflected waves against the generated oscillations.

The most efficient operating region on the grid voltage—plate current characteristic is the region with the highest transconductance. It is, however, possible to sweep the excitation voltage across the region of the highest transconductance of the dynamic characteristic. The operating point then has to be shifted towards the lower bent of the static characteristic.

Figure 6:
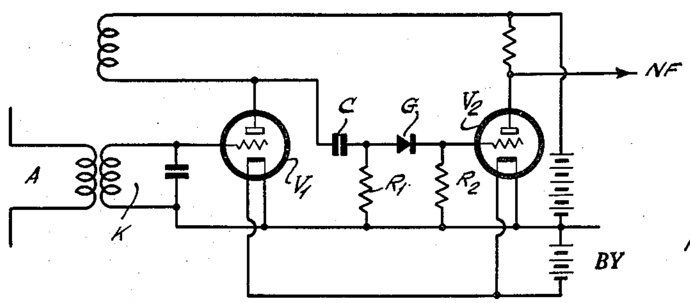
Figure 6 shows a further and improved circuit according to the invention.

Figure 6 shows, as an example, a method to eliminate the disturbances caused by low-frequency microphonics. $V_1$ is the oscillator tube, the grid of which is connected to the tuned circuit K coupled to the antenna A. The plate circuit again contains the feedback coil. The radio frequency voltages at the plate of the tube are transmitted through condenser C to the rectifier G. The capacity of condenser C is chosen so that the latter, in combination with resistor $R_1$, will pass only the radio frequency components of the plate voltage, e. g. frequencies around 100 mc./s. As a result, the voltages caused by low-frequency microphonics, confined to a range of some hundreds to some thousands of cycles per second, are blocked by condenser C. The rectified radio-frequency voltage appears across resistor $R_2$ at the grid of tube $V_2$ which is the first tube of the low-frequency amplifier. This voltage contains components which are produced by the beating of the received wave against the emitted wave and which, when reaching a predetermined level, cause the firing of the detonator. The said voltage contains further components which are originated by high-frequency microphonics. These, however, have not been found to be very harmful, as their amplitudes are much smaller than those produced by low-frequency microphonics. The voltages which are produced by the latter kind of microphonics are not existent at the grid of tube $V_2$, as they are blocked by the high-pass filter formed by condenser C and resistor $R_1$. As a result the probability of misfiring due to microphonics is considerably reduced.

It is important to select the proper values for condenser C and resistor $R_1$. If, e. g., the capacity of condenser C is 20 mmfd. and the resistance of resistor $R_1$ is 0.1 megohm, the voltages due to low-frequency microphonics are attenuated by more than 1:130, assuming that they occupy the frequency range below 1 kc./s. As a result, the disturbing effect is practically completely suppressed, as, in practice, a reduction to 1:10 is sufficient for practical purposes. As an alternative, it is possible to use a choke instead of resistor $R_1$, the resonant frequency of which is advantageously equal to the frequency of the emitted waves.

We claim:

1. A proximity control device comprising a regenerative vacuum tube oscillator-receiver having grid and anode oscillating circuits coupled beyond the degree of minimum feedback to generate continuous oscillations, antenna means coupled with the grid circuit of said tube to transmit high frequency waves and to receive said waves upon reflection by a distant object in relative motion towards said device, to produce beat signals between the transmitted and reflected waves due to Doppler effect, and means to maintain maximum amplification of said tube for said beat signals comprising automatic amplitude control means external of said tube to maintain a constant oscillating amplitude such as to cause said tube to operate at maximum transconductance of its grid voltage-plate current characteristics, said control means having an attack time constant in excess of a Doppler beat cycle between said transmitted and said reflected waves.

2. A proximity control device comprising a regenerative vacuum tube oscillator having grid and anode oscillating circuits coupled beyond the point of minimum feedback to generate continuous oscillations, antenna means connected to the grid circuit of said tube to transmit high frequency waves and to receive said waves upon reflection by a distance object in relative motion towards said device, to produce beat signals between the transmitted and reflected waves due to Doppler effect, and means to maintain maximum amplification of said tube for said beat signals comprising rectifier and filter means connected between said anode and grid circuits to provide varying negative grid biasing potential and to maintain a constant oscillating amplitude such as to cause said tube to operate at maximum transconductance of its grid voltage-plate current characteristics, said filter means having a time constant in excess of the Doppler beat cycles between said transmitted and said reflected waves.

3. A proximity control device comprising a regenerative vacum tube oscillator having grid and anode oscillating circuits coupled beyond the point of minimum feedback to generate continuous oscillations, antenna means connected to the grid circuit of said tube to transmit high frequency waves and to receive said waves upon reflection by a distant object in relative motion towards said device, to produce beat signals between the transmitted and reflected waves due to Doppler effect, and means to maintain maximum amplification of said tube for said beat signals comprising an absorbing circuit including current responsive resistance means and arranged to by-pass increasing portions of anode oscillating current in proportion to increasing oscillating amplitude, to maintain a constant oscillation amplitude such as to cause said tube to operate at maximum transconductance of its grid voltage-plate current characteristic, said absorbing circuit having an attack time constant in excess of the Doppler beat cycles between said transmitted and said reflected waves.

References Cited in the file of this patent

UNITED STATES PATENTS

| | | |
|---|---|---|
| 2,138,138 | Bruckner | Nov. 29, 1938 |
| 2,294,171 | George | Aug. 25, 1942 |
| 2,319,965 | Wise | May 25, 1943 |
| 2,403,567 | Wales | July 9, 1946 |
| 2,424,263 | Woodyard | July 22, 1947 |
| 2,424,905 | Scheldorf | July 29, 1947 |

OTHER REFERENCES

"Radio Engineering," by F. E. Terman, 3rd edition, 1947, McGraw-Hill Book Co., Inc., New York, pages 505–6.

Huntoon et al.: "Generator-Powered Proximity Fuze," Electronics, December 1945, pages 98–103.

Hinman et al.: "Radio Proximity Fuze Design," National Bureau of Standards Research Paper RP 1723, vol. 37, July 1946, (18 pages).